United States Patent [19]

Grosselfinger et al.

[11] Patent Number: 4,813,226
[45] Date of Patent: Mar. 21, 1989

[54] DEMAND CONTROL OF VARIABLE GEOMETRY GAS TURBINE POWER PLANT

[76] Inventors: Robert A. Grosselfinger, 6202 Stardust La., Bethesda, Md. 20817; Andrew N. Carras, 1705 Glenkearny Pl., Silver Spring, Md. 20902

[21] Appl. No.: 2,070
[22] Filed: Jan. 12, 1987
[51] Int. Cl.$^4$ ............................................... F02C 9/00
[52] U.S. Cl. ................................. 60/39.2; 60/39.27; 60/235
[58] Field of Search ................ 60/39.27, 235, 237, 60/239, 240, 39.25

[56] References Cited

U.S. PATENT DOCUMENTS

| | | | |
|---|---|---|---|
| 3,523,423 | 8/1970 | Young | 60/239 |
| 3,777,479 | 12/1973 | Hagen | 60/235 |
| 3,919,838 | 11/1975 | Armstrong | 60/39.27 |
| 4,178,754 | 12/1979 | Earnest | 60/39.27 |
| 4,294,069 | 10/1981 | Camp | 60/239 |

Primary Examiner—Louis J. Casaregola
Attorney, Agent, or Firm—Griffin, Branigan, & Butler

[57] ABSTRACT

In a gas turbine power plant system having an engine of the variable geometry type, the variable geometry is controlled in response to an input demand speed signal rather than a signal representing actual engine speed. The geometry which may be varied may take many forms depending on engine design, including variable compressor guide vanes, variable turbine nozzle area or variable engine exhaust nozzle area.

5 Claims, 2 Drawing Sheets

DEMAND CONTROL OF VARIABLE GEOMETRY GAS TURBINE POWER PLANT

BACKGROUND OF THE INVENTION

The present invention relates to gas turbine power plant systems wherein the engine is of the variable geometry type. In such systems controls are provided for controlling not only fuel flow but also air or gas flow as well. The air or gas flow is controlled by varying the geometry of the flow path through the engine.

In gas turbine power plant systems, the control of the gas turbine during power-increasing transient intervals has been a problem because of the necessity of avoiding dangerously high turbine inlet temperatures and compressor surge while at the same time increasing the gas turbine speed as rapidly as possible. Heretofore, the problem has been alleviated by providing limiting devices which limit some pertinent engine operating variable either to a specific value or according to a predetermined operating schedule. The disadvantage of a limiting device is that the value to which the selected engine variable is limited depends on such conditions as ambient temperature, pressure, etc., and compensation must be provided for changes in these conditions. Devices capable of accomplishing this compensation are quite complex and expensive.

SUMMARY OF THE INVENTION

An object of the present invention is to provide an improved gas turbine power plant system of the type wherein the compressor or a turbine includes at least one variable geometry element for varying the geometry of the gas flow path, the variable geometry element being controlled in response to a speed demand signal.

An object of the present invention is to provide a method of and apparatus for controlling the geometry of a variable geometry gas turbine power plant, as a function of the magnitude of a speed demand signal.

An object of the present invention is to provide a gas turbine power plant system including a variable geometry engine, and control apparatus for controlling the engine geometry as well as fuel flow to the engine, the control apparatus including a function generator responsive to a demand speed signal representing a desired speed for adjusting the engine geometry, and fuel control means, responsive to the difference between the demand speed signal and a signal representing actual engine speed, for adjusting the rate of fuel flow to the engine. The demand speed signal is delayed prior to comparison with the signal representing actual speed so that the engine geometry is changed before the fuel flow rate is changed when there is a change in the magnitude of the demand speed signal. The engine geometry which may be changed depends on the engine design and includes, but is not limited to, variable compressor guide vanes, variable turbine nozzle area and variable engine exhaust nozzle area.

Other objects and advantages of the invention and its mode of operation will become apparent upon consideration of the following description and the accompanying drawings.

DETAILED DESCRIPTION OF THE INVENTION

Figure 1:
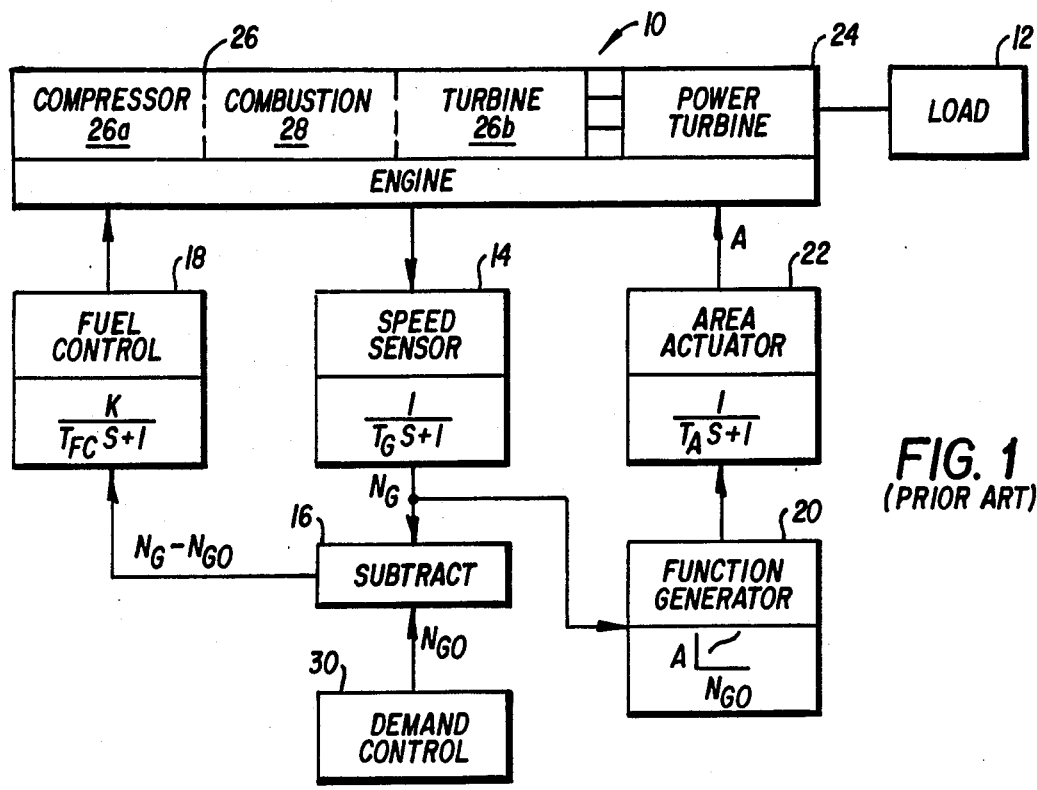
FIG. 1 illustrates a gas turbine power plant system of the prior art wherein engine geometry is controlled in accordance with actual engine speed.

FIG. 1 illustrates a gas turbine power plant system of the prior art. It includes an engine 10 for driving a load 12, the engine being controlled by a control system comprising an engine speed sensor 14, a subtractor 16, a fuel control 18, a function generator 20 and an area actuator 22.

There are many gas turbine system cycles to which the present invention is applicable but for purposes of illustration it will be assumed that the engine 10 comprises a gas generator such as a turbojet 26 producing exhaust gases for driving a free or power turbine 24, the free turbine in turn driving the load 12 which may be a propeller. The gas generator 26 may be of conventional design, including a compressor 26a and a turbine 26b for driving the compressor, exhaust gases from the gas generator turbine being used to drive the free turbine 24. The speed sensor 14 senses the speed of rotation of the engine or more specifically the speed of rotation of the gas generator in the engine. The speed sensor has a delay or first order lag, the time constant being designated $T_G$. The delayed signal representing actual engine speed is designated $N_G$ and is applied to one input of a subtractor 16. The subtractor receives a second signal $N_{GO}$ at a second input, $N_{GO}$ being a signal representing the demand or desired engine speed as determined by a demand control 30. Subtractor 16 determines the difference between the desired $N_{GO}$ and the actual speed $N_G$ and applies an error signal proportional to this difference to the fuel control 18. The fuel control has a gain factor K and a first order lag $T_{FC}$ and it produces the rate of fuel flow $W_F$ to the combustion region 28 of the gas generator thereby increasing or decreasing the engine speed until it is equal to the desired speed represented by $N_{GO}$.

The signal $N_G$ representing actual engine speed is also applied to the function generator 20. The function generator is a cam or other means for producing an output signal A in response to $N_G$ where the signal A represents the free turbine nozzle area required for a given gas generator speed in order to obtain optimum operating conditions for a given load condition. The signal A is applied to the area actuator 22 which, after a delay $T_A$, adjusts the free turbine nozzle area.

Figure 2:
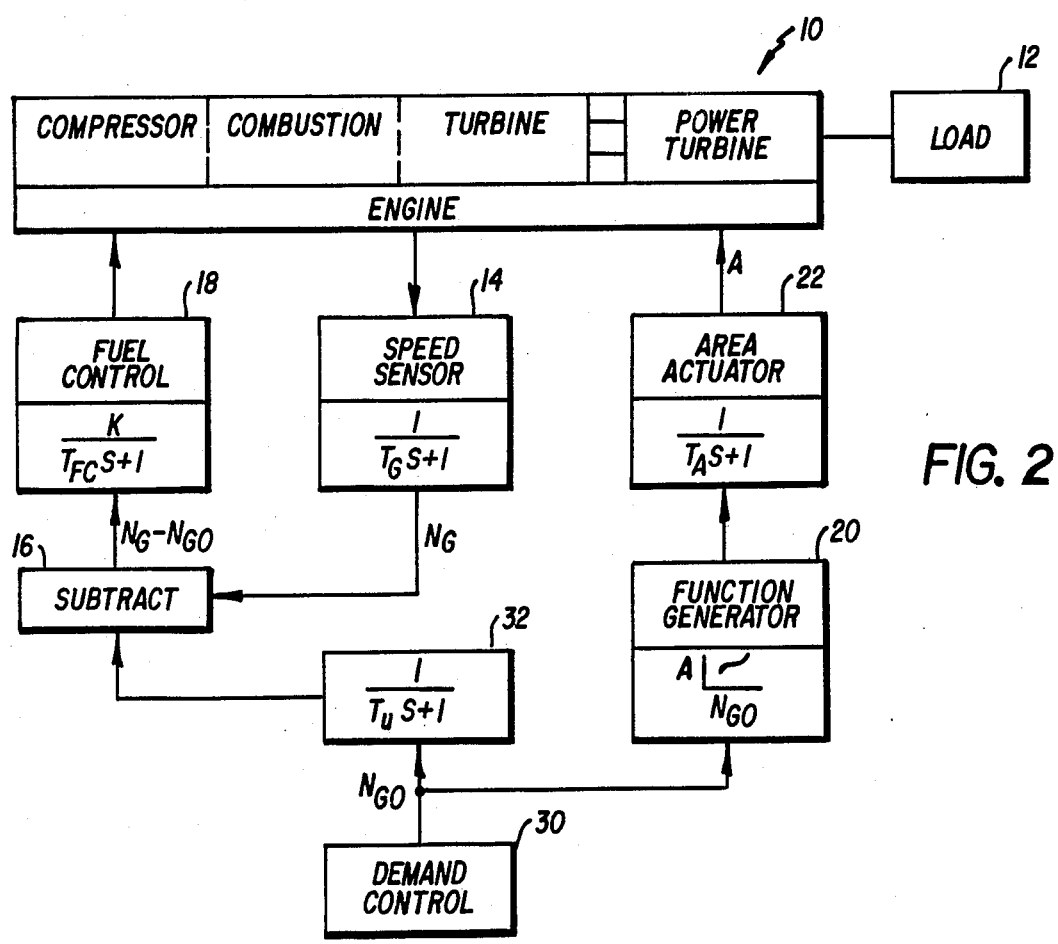
FIG. 2 illustrates a gas turbine power plant system wherein engine geometry is controlled in accordance with demand speed; and, FIG. 3 is a diagram illustrating compressor performance in a system constructed in accordance with the principles of the present invention.

FIG. 2 illustrates a gas turbine power plant system constructed in accordance with the principles of the present invention. Like the prior art system shown in FIG. 1, it includes an engine 10 driving a load 12, the engine being controlled by a control system comprising a speed sensor 14, a subtractor 16, a fuel control 18, a function generator 20, an area actuator 22 and a demand control 30. However, in the system of FIG. 2 the output signal $N_G$ from the speed sensor 14 is not applied to the function generator 20. Instead, the speed demand signal $N_{GO}$ produced by demand control 30 is applied to the function generator. In addition, the speed demand signal $N_{GO}$ is applied to a delay or lag means 32 having a time constant $T_U$ and the delayed speed demand signal is then applied to subtractor 16 which determines the speed error. Thus, the geometry of the engine is varied almost immediately upon a change in the speed demand signal $N_{GO}$, but with a necessarily slight delay $T_A$ associated with the area actuator 22. The time constant $T_U$ of delay means 32 is selected such that determination of the speed error and resulting change in fuel flow is delayed until the change in engine geometry has had its effect on the engine. This insures that the gas flow through the engine is adjusted before the fuel flow is time-dependently adjusted.

As previously indicated, the invention is not limited in its application to the specific engine shown. It is equally applicable to engines wherein the turbine 24 is mechanically connected to the gas generator, or to engines which merely comprise a compressor driven by a turbine (i.e. turbojet). The engine geometry which may be varied may likewise depend on the specific engine employed. Thus, in addition to turbine nozzle area, the geometry which may be varied includes variable compressor guide vanes and variable exhaust nozzle area of the engine. Furthermore, while it is possible to sense various engine parameters to control fuel flow, the sensing of engine speed is preferred.

Figure 3:
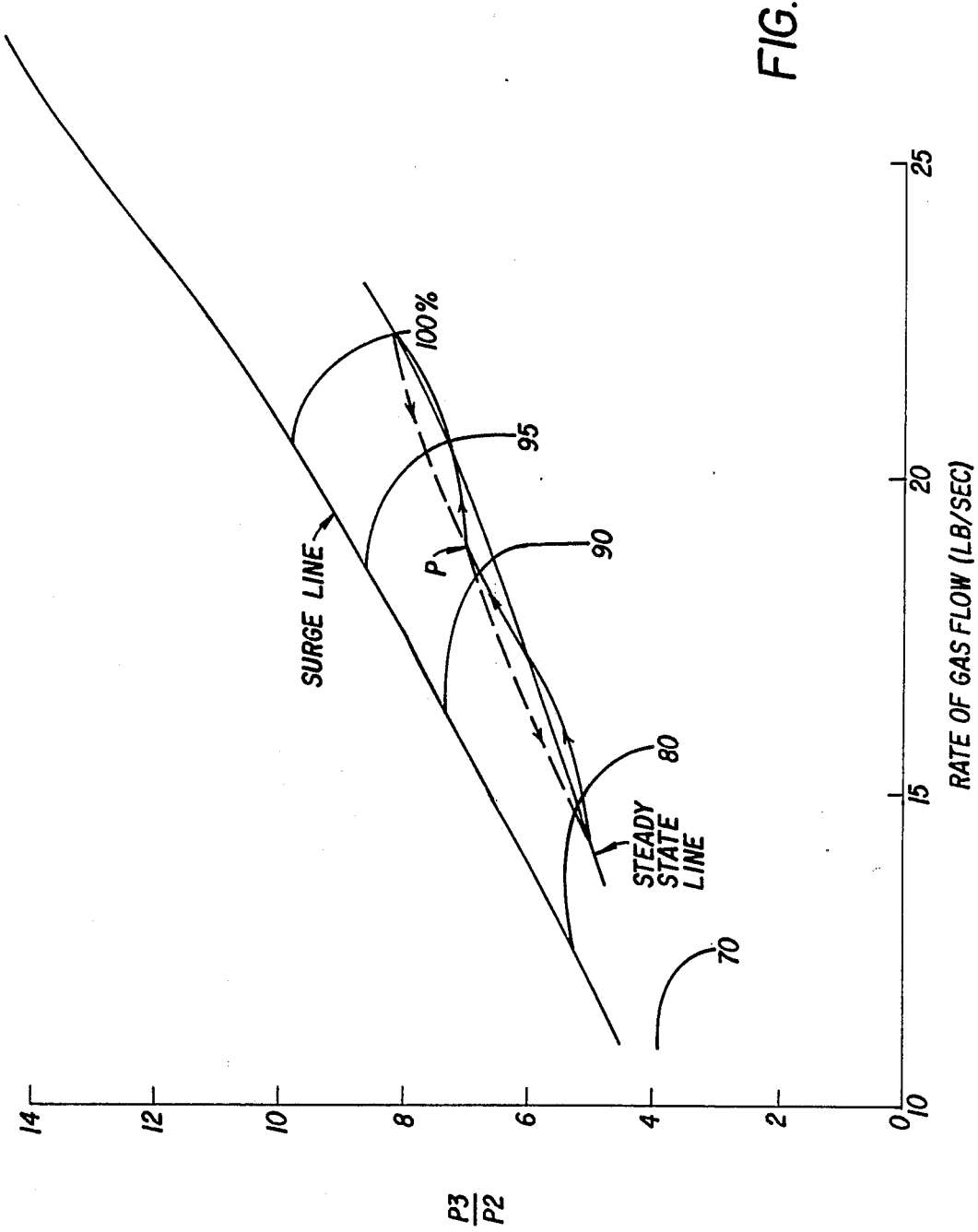

FIG. 3 is a compressor map useful in analyzing the operation and advantages of the present invention as applied to a variable geometry engine wherein the geometry varied is the nozzle area of the gas generator turbine. It is a computer simulation wherein the rate of air flow is plotted on the horizontal axis and the ratio of compressor discharge pressure to compressor inlet pressure is plotted on the vertical axis.

Compressor surge is a well known phenomenon which occurs when some parameter is varied which increases the resistance to gas flow through the compressor to a point where the compressor is not capable of producing the necessary discharge pressure. A momentary flow reversal, called surge, occurs and hot gas flows backward from the later stages of the compressor. The surge also induces vibratory stresses in the compressor which may damage the compressor. In FIG. 3, if the ratio of compressor discharge pressure to intake pressure for a given rate of air flow is above the surge line, then compressor surge occurs. It is important therefore that the compressor operate below the surge line.

The steady state line is drawn through three points A, B and C and is established by a determination of minimum fuel consumption or optimum efficiency as a function of engine speed and variable nozzle area. The broken line with arrows represents transient solutions as engine speed is reduced from 100% (17,500 rpm) to 78%. The solid line with arrows represents transient solutions as engine speed is increased from about 78% back to 100%.

Returning to FIG. 2, in the case where the manipulated geometry of the engine is the nozzle area after the gas generator turbine 26b and before the power turbine, opening or increasing the nozzle area increases the expansion ratio across the gas generator turbine causing the gas generator to accelerate whithout the introduction of additional fuel. As shown in FIG. 3, the resulting increase in air flow causes a transient to initially take place to the right of the steady state operating line and even further away from the surge line. Immediately thereafter, the delayed speed demand signal is compared to the actual speed signal and the speed error causes the fuel control 18 to increase fuel flow. The transient moves upwardly in FIG. 3 and, in the illustrated case, crosses the steady state operating line.

By minimizing the time constant $T_A$ of actuator 22 and with judicious selection of the time constant $T_U$ and the fuel control gain K it may be seen that the complete transient can readily be made to take place to the right of the steady state operating line of FIG. 3 by any desired degree. Furthermore, the acceleration can be made to actually take place to the left of the steady state line by selecting smaller values of $T_U$ and larger values of fuel control gain K. In this manner, any desired compromise between transient turbine inlet temperature and elapsed acceleration time can be selected. FIG. 3 illustrates the case where the transient takes place virtually on the steady state operating line in both the acceleration case and deceleration case. If the engine can be operated at its steady state points, it follows that the engine can be operated in transient between the steady state points without limiting devices such as those used in the prior art.

With the present invention, transients equivalent to conventional transients can be made to take place at lower turbine inlet temperatures. This is due to the fact that more fuel flow can be introduced at larger gas flow thereby providing the same or more total energy to the gas generator turbine at lower temperatures. The result is that transient temperatures can be reduced with better gas generator or engine response and the means for compromising these two factors is simply implemented. The particular case shown in FIG. 3 represents a selected compromise which provides increased engine hot-section life, improved response, and a reduction in the formation of oxides of nitrogen which are environmentally undesirable.

In the case where the variable geometry effecting gas flow is compressor variable guide vanes, almost the same result is obtained as for the case where the nozzle area of the gas generator turbine is varied. An increse in the magnitude of the demand speed signal opens the compressor guide vanes which increases gas flow and momentarily loads the compressor thus causing a decrease in the speed of the gas generator. This decrease, at the outset, establishes a positive speed error (at subtractor 16) which tends to increase the fuel flow. As previously explained, gas mass flow increases prior to the increase in fuel flow. By judicious selection of time constants for the geometry and fuel control the same benefits may be obtained as for the previously described case.

Similar results are obtained when the geometry varied is engine exhaust nozzle area. Thus, the benefits of the invention can be obtained, for example, by varying the exhaust nozzle area of a single spool turbojet engine. It might be noted that such an engine might already include an area actuator means as part of an after-burner type of propulsion system.

In addition to the lower turbine inlet temperatures during transient periods and reduced formation of oxides of nitrogen, which is a function of elevated gas temperature, the present invention provides other advantages over the prior art. The ability to control engine transients close to the steady state operating line clearly suggests that flame-out detectors and minimum fuel flow limiters are not required.

A very important consideration is the marked increase in the stall or surge recovery capability of the engine resulting from such external effects as inlet distortion, steam or rocket gas ingestion, etc. With the present invention (FIG. 2) the stall circumstance is largely mitigated because the geometry area remains constant with the surge induced deceleration. That is, the demand speed signal $N_{GO}$ does not change hence the area actuator output signal does not change. On the other hand, in the prior art system of FIG. 1 the surge induced deceleration decreases the magnitude of the signal $N_G$ thereby decreasing the geometry area and further aggravating the surge circumstance. This is true even though the engine fuel flow may be limited by a maximum temperature limiter in both cases. In the case of the prior art system it is frequently necessary to shut down the engine and restart it. On the other hand, with the present invention the flow path area remains unchanged (and thus larger than in the prior art system), the larger area being conducive to automatic recovery.

From the foregoing description it is seen that the present invention provides a novel and simple method and means for controlling a variable geometry gas turbine power plant. The novel method and apparatus provides many distinct advantages over the prior art including elimination of the need for flame-out detectors and minimum fuel flow limiters, lower transient turbine inlet temperatures, reduced formation of oxides of nitrogen and an increase in the stall or surge recovery capability of the engine. Furthermore, because of the reduction of surge margin (i.e. distance between the steady state and surge lines of FIG. 3) made possible by the present invention, compressor designers have a wider latitude in compressor design which may lead to better efficiencies and lighter weight.

While a specific preferred embodiment has been described for purposes of illustration, it will be understood that various modifications and substitutions may be made in the described embodiment without departing from the spirit and scope of the invention and defined by the appended claims.

The embodiments of the invention in which an exclusive property and privilege are claimed are defined as follows.

We claim:

1. In a gas turbine power plant system having an engine of the variable geometry type, apparatus for controlling said engine in response to a demand speed signal, said apparatus comprising:
    actuator means responsive to said demand speed signal for varying the geometry of said engine to vary the rate of gas flow therethrough;
    means for sensing actual engine speed and producing an actual engine speed signal;
    means responsive to said sensing means and said demand speed signal for adjusting the rate of fuel flow to said engine after said engine geometry has been varied.

2. Apparatus as claimed in claim 1 wherein the geometry that is varied is the nozzle area of a power turbine.

3. Apparatus as claimed in claim 1 wherein the geometry that is varied is the guide vanes in a compressor.

4. Apparatus as claimed in claim 1 wherein the geometry that is varied is the exhaust nozzle area of said engine.

5. Apparatus as claimed in claim 1 wherein said means for adjusting the rate of fuel flow includes:
    delay means for delaying said demand speed signal; and,
    means for varying the rate of fuel flow by a factor K times the difference between said actual engine speed signal and said delayed demand speed signal.

* * * * *